US009660819B2

(12) United States Patent
Gouache et al.

(10) Patent No.: US 9,660,819 B2
(45) Date of Patent: May 23, 2017

(54) SYSTEM AND METHOD FOR COMBINING MULTIPLE COMMUNICATION LINKS

(71) Applicant: THOMSON LICENSING, Issy de Moulineaux (FR)

(72) Inventors: Stephane Gouache, Cesson Sevigne (FR); Guillaume Bichot, La Chapelle Chaussee (FR); Anthony Laurent, Vignoc (FR)

(73) Assignee: Thomson Licensing DTV, Issy-les-Moulineaux (FR)

( * ) Notice: Subject to any disclaimer, the term of this patent is extended or adjusted under 35 U.S.C. 154(b) by 24 days.

(21) Appl. No.: 14/369,711

(22) PCT Filed: Dec. 21, 2012

(86) PCT No.: PCT/EP2012/076596
§ 371 (c)(1),
(2) Date: Jun. 29, 2014

(87) PCT Pub. No.: WO2013/098230
PCT Pub. Date: Jul. 4, 2013

(65) Prior Publication Data
US 2014/0355605 A1 Dec. 4, 2014

(30) Foreign Application Priority Data

Dec. 30, 2011 (EP) .................................. 11306816

(51) Int. Cl.
*H04J 3/16* (2006.01)
*H04L 12/18* (2006.01)
(Continued)

(52) U.S. Cl.
CPC ............ *H04L 12/18* (2013.01); *H04L 12/185* (2013.01); *H04L 12/2838* (2013.01); *H04L 65/403* (2013.01)

(58) Field of Classification Search
None
See application file for complete search history.

(56) References Cited

U.S. PATENT DOCUMENTS

| 6,101,180 A | 8/2000 | Donahue et al. |
| 6,182,147 B1 | 1/2001 | Farinacci |

(Continued)

FOREIGN PATENT DOCUMENTS

| CN | 101360216 A | 2/2009 |
| CN | 101521626 | 9/2009 |

(Continued)

OTHER PUBLICATIONS

Park et al., "Convergence of broadcasting and communication in home network using an EPON-based home gateway and overlay", IEEE Transactions on Consumer Electronics, vol. 51, No. 2, May 2005, pp. 485-93.

(Continued)

*Primary Examiner* — Bob Phunkulh
(74) *Attorney, Agent, or Firm* — Myers Wolin, LLC (57) ABSTRACT

This invention relates to a client device capable of receiving a multicast content through multiple communication networks, comprising at least one broadband network having a broadband bandwidth and one broadcast network for connection respectively to at least one broadband interface and one receive-only broadcast interface of the client device, wherein said client device comprises an adapter selector capable of selecting the interface to be used in order to save the broadband band-width.

11 Claims, 7 Drawing Sheets

(51) Int. Cl.
*H04L 12/28* (2006.01)
*H04L 29/06* (2006.01)

(56) References Cited

U.S. PATENT DOCUMENTS

| | | | |
|---|---|---|---|
| 6,389,453 | B1 | 5/2002 | Willis |
| 6,487,170 | B1 | 11/2002 | Chen et al. |
| 2003/0012180 | A1 | 1/2003 | Donahue et al. |
| 2003/0121047 | A1 | 6/2003 | Watson et al. |
| 2004/0151162 | A1* | 8/2004 | Ramaswamy ........ H04W 40/02 370/352 |
| 2006/0098618 | A1 | 5/2006 | Bouffioux |
| 2006/0221962 | A1 | 10/2006 | Previdi et al. |
| 2008/0259835 | A1* | 10/2008 | Venkatachalam ..... H04L 12/189 370/311 |
| 2009/0100465 | A1* | 4/2009 | Kulakowski ........ H04L 12/5895 725/39 |
| 2009/0170607 | A1 | 7/2009 | Chiao et al. |
| 2010/0023985 | A1* | 1/2010 | Cha .................. H04N 7/163 725/110 |
| 2011/0055879 | A1* | 3/2011 | Stone ................. H04L 12/2801 725/82 |
| 2011/0058551 | A1 | 3/2011 | Fernandez Gutierrez |
| 2011/0064049 | A1 | 3/2011 | Jeon et al. |
| 2011/0072478 | A1 | 3/2011 | Patil et al. |
| 2011/0106744 | A1* | 5/2011 | Becker ................ H04N 5/445 706/46 |

FOREIGN PATENT DOCUMENTS

| | | |
|---|---|---|
| EP | 1298836 | 4/2003 |
| EP | 2048881 A1 | 4/2009 |
| EP | 2242259 | 10/2010 |
| JP | 2007-335924 A2 | 12/2007 |
| JP | 2009-160369 A | 7/2009 |
| JP | 2009-171038 A2 | 7/2009 |
| KR | 2008089980 | 10/2008 |
| WO | WO9820724 | 5/1998 |
| WO | WO0011836 | 3/2000 |

OTHER PUBLICATIONS

Sun et al., "Networking issues in IP multicast over satellite", International Journal of Satellite Communications and Networking, vol. 21, No. 4-5, Jul. 0 Oct. 2003, pp. 489-507.
Cain et al., "Internet Group Management Protocol, Version 3", Network Working Group Request for Comments 3376 Obsoletes 2236, Oct. 2002, pp. 1-53.
Waitzman et al., "Distance Vector Multicast Routing Protocol", Network Working Group Request for Comments 1075, Nov. 1988, pp. 1-24.
Christensen et al., "Considerations for Internet Group Management Protocol (IGMP) and Multicast Listener Discovery (MLD) Snooping Switches", Network Working Group Request for Comments 4541, May 2006, pp. 1-16.
Deering, "Host Extensions for IP Multicasting", Network Working Group Request for Comments 1054, Aug. 1989, pp. 1-15.
Fenner, "Internet Group Management Protocol, Version 2", Network Working Group Request for Comments 2236 Update 1112, Nov. 1997, pp. 1-24.
DVB Organization: "cm076 DVB-IP Phase 1.1 Handbook.doc", DVB, Digital Video Broadcasting; C/O EBU-17A Ancienne Route—CH-1218 Grand Saconnex, Geneva-Switzerland, Jan. 30, 2006.
Park etal: "Convergence of Broadcasting and Communication in Home Network Using an EPON-Based Home Gateway and Overlay",IEEE Trans. on Consumer Electronics, vol. 51, No. 2. p. 485-493.
Search Report Dated Mar. 18, 2013.
Benali et al., "Providing Flexible Service Creation, Announcement and Discovery for Converged Broadcast and Cellular Networks", 3rd International IST-Anwire Workshop on Adaptable Service Provision, Paris, France, Nov. 18, 2003.

* cited by examiner

SYSTEM AND METHOD FOR COMBINING MULTIPLE COMMUNICATION LINKS

This application claims the benefit, under 35 U.S.C. §365 of International Application PCT/EP2012/076596, filed Dec. 21, 2012, which was published in accordance with PCT Article 21(2) on Jul. 4, 2014 in English and which claims the benefit of European patent application No. 11306816.7, filed Dec. 30, 2011.

INTRODUCTION

This invention relates to a client device capable of receiving a multicast stream through multiple communication networks. More particularly, this invention relates to a client device capable of receiving a multicast content through multiple communication networks, comprising at least one broadband network and one broadcast network for connection respectively to at least one broadband interface and one receive-only broadcast interface of the client device. Furthermore, the invention relates to a method for sending and/or receiving a multicast content through multiple communication networks.

BACKGROUND TO THE INVENTION

Multicast, unidirectional link, combination of multiple communication links, multicast proxy, and multicast router are concepts or components which are widely used in multicast streaming sessions. Within a multicast streaming session, a multicast traffic is sent as a data stream to various receivers. The group of receivers however may vary in time. Receivers indicate their desire to receive a given multicast session using the IGMP protocol (RFC 3376).

A unidirectional link is a transmission channel that does not offer a return path. Multicast routing protocols exist that route multicast traffic through the Internet. For example, DVMRP (RFC 1075) and PIM protocols can be applied. There is also a daemon called IGMP-Proxy that proxies IGMP requests from one network to another network and thus implements a kind of IGMP snooping similar to what is described in RFC 454.

Smart management of the delivery network for multicast and broadcast traffic in a client device, such as a gateway can be done by selecting the most appropriate network adapter.

Multicast IP is composed with two main features. Firstly, an addressing scheme based on the group address wherein the IP address identifies a multicast group that is a TV channel/stream when applied to IPTV and secondly a IP signaling companion protocol called IGMP (IP Group Management Protocol) that is used by a terminal/application to signal its connection and disconnection to a group which is for example a TV channel. The IGMP protocol allows an IP network which is composed of one or more routers to optimize the distribution of multicast IP traffic by forwarding multicast IP packet only over branches where at least one group member has been signaled. Broadcast network has evolved in a way that it can transport IP streams including multicast IP streams. Alternatively, in the context of IPTV, IGMP is also used for selecting a TV channel.

Various attempts have been made in order to improve multicast transmission to a client in order to optimize distribution of the multimedia content.

In CN 101521626 A, a method for stepping control of a multicast program is shown which includes the following steps. Sending a multicast program request message to the access device by the terminal device; referring and obtaining the program step parameter by an access device according to said multicast program request message; and generating the multicast program data by the access device according to said program step parameter. The manufacturer can therefore order some multicast programs according to the multicast program stepping control terminal device in priority and provides a differentiated service according to the program.

In US 2006/0098618 A1, a method, a bridging device, a network of devices as well as a computer program product and a computer program element are shown which can be used for prioritizing transportation of isochronous data streams from a first bus having a first bandwidth to a second bus using a medium having a second medium bandwidth lower than the first bandwidth. The bridging device monitors control traffic relating to data streams originating from devices connected to the buses, polls the registers made available by the devices connected to the buses, prioritizes streams for transfer based on relevant information transported in the bus control traffic and/or made available by the devices connected to a bus and transfers streams over the medium based on the prioritizing. Accordingly, prioritizing streams for transportation over a wireless bridge between two data buses that is transparent to devices connected to the buses is possible.

In US 2011/0058551 A1, a method for managing multicast traffic through a switch operating in the layer 2 of the OSI model, and routers and switches involved in the method are shown. In one implementation, a router sends to a switch a message containing identification of a specific equipment which has requested specific multicast traffic, and also containing a specification of the specific traffic, and when the switch receives data carrying multicast traffic, based on the destination and origin addresses of the data, and based on the identification of the specific equipment and of the specification of the specific multicast traffic that it has received in the message, the switch deduces if the data carry the specific traffic that has been requested by the specific equipment, and decides through which of its ports it transmits the data.

In U.S. Pat. No. 6,487,170 B1, a method and apparatus are provided for making admission decisions in a packet switched network, such as a Differentiated Services (DiffServ) Packet Network. According to one aspect, admission control decisions are based upon local information. An average premium service bandwidth utilized on an output link of a network device during a predetermined window of time is calculated. A determination regarding whether to accept or reject a request for a premium service flow involving the output link is made based upon the request, a total premium service bandwidth available on the output link, the average premium service bandwidth, and bandwidth request information associated with one or more flows that have been admitted within a predetermined holding time interval. According to another aspect, multicast flows are supported. A measure of utilized premium service bandwidth is calculated for each of the output links of a multicast-capable network device. A request for premium service bandwidth for a multicast session is forwarded onto those of the output links specified by a multicast routing protocol which have sufficient premium service bandwidth available to accommodate the request based upon the total premium service bandwidth available on the output link, the measure of utilized premium service bandwidth on the output link, and the request. For each of the output links associated with the multicast session, a link state is maintained. The link state indicates the current state of a state machine that determines the behavior of the multicast-capable network device for the corresponding output link of the multicast session. Multicast packets that are subsequently received are forwarded according to the link states associated with the output links.

The paper of Wan-Ki Park and Dae-Young Kim: "Convergence of Broadcasting and Communication in Home Network Using an EPON-Based Home Gateway and Overlay", IEEE Transactions on Consumer Electronics, Vol. 51, no. 2, pages 485-493, 2005, describes home network systems including a home gateway which are expected to facilitate the convergence of broadcasting and communication services to complement the ubiquitous computing and services. A modified architecture is shown that integrates broadcasting and data services in a home network. For this architecture, an overlay transport mechanism in access network and IP multicast techniques of the Internet group management protocol (IGMP) and IGMP snooping in a home network is used.

Furthermore, it is known to select dynamically, in the head-end, the most appropriate network which is a broadcast unidirectional link like DVB-T, DVB-C or DVB-H or broadband link to deliver IP multicast traffic.

Such a concept has been described in EP 1298836 A1. Within this document, a principle is shown which attributes to privilege the broadcast link when a given number of users request the same content and save the broadband bandwidth.

This concept, however, presents some limitations. The multicast content available either over broadband or broadcast is selected by the operator. Consequently, the quantity and diversity of multicast contents concerned by this load balancing is limited. If the user wants to receive other multicast content, this last will be automatically delivered over broadband, even if it is much more queried than other multicast traffic delivered over broadcast. Furthermore, the client is seen as a simple terminal with a single broadcast adapter and receiving a single IP multicast service simultaneously. Optimizing can be done for the delivery of multiple IP multicast streams (and also broadcast ones) to the home network.

Accordingly, there is a need in the art to overcome, at least partially, the problems associated with the prior art systems.

SUMMARY OF THE INVENTION

According to the invention, there is provided a client device capable of receiving a multicast content through multiple communication networks, comprising at least one broadband network having a broadband bandwidth and one broadcast network for connection respectively to at least one broadband interface and one receive-only broadcast interface of the client device, wherein said client device comprises an adapter selector capable of selecting the interface to be used in order to save the broadband bandwidth.

The client device is, for example, a gateway.

According to an embodiment of the invention, the adapter selector is capable of sending a message using a protocol to permit signaling and activation of the selected interface and requesting a routing of the multicast content through the appropriate communication network.

According to a further embodiment of the invention, the adapter selector is able to capture and analyze a client request of a multicast stream and is further able to send, if needed, a control message towards a multicast proxy server, requesting that the multicast stream is served over the at least one broadcast network.

According to a further embodiment of the invention, the protocol is an extension of an IP Group Management Protocol.

In a further aspect of the invention, there is provided a method for sending and/or receiving a multicast content through multiple communication networks, comprising at least one broadband network having a broadband bandwidth and one broadcast network being connected respectively to at least one broadband interface and one receive-only broadcast interface of a client device, wherein said method comprises a step of selecting the interface to be used in order to save the broadband bandwidth. According to an embodiment of the invention, the method further comprises a step of receiving requests and redirecting the requests to a broadcast router such that a IP multicast stream is selected to be transmitted over the broadcast network to the broadcast interface of the client device.

According to a further embodiment of the invention, the method comprises a step of sending a message using a protocol to signal and to activate the selected interface and a step of requesting a routing of the multicast content through the appropriate communication network.

According to a further embodiment of the invention, the method comprises a step of capturing and analyzing a client request of a multicast stream and a step of sending, if needed, a control message towards the multicast proxy, requesting that the multicast stream is served over the at least one broadcast network.

According to a further embodiment of the invention, the method comprises a step of redirecting the client request to a corresponding broadcast router which builds a required distribution tree so as to send the multicast content to the client device over the broadcast network.

Advantageously, the protocol is an extension of an IP Group Management Protocol.

Preferably, the protocol includes a message to signal a request from the client device to receive or to stop receiving a multicast IP stream.

According to an embodiment, the protocol includes a message to signal a request received from the multicast proxy server indicating that a multicast IP stream is no longer available or is now available on the broadcast network.

Advantageously, the interface to be used is selected according to the multicast content bandwidth and/or the popularity of said multicast content.

The popularity of a content means here the number of clients interested by said content.

According to the invention, the behavior of the client device, particularly a home network gateway with at least one broadcast adapter when a client requests an IP multicast stream, knowing that other clients may be receiving simultaneously multicast or broadcast streams is described. The gateway attempts to affect the most bandwidth-consuming stream(s) on the broadcast channel. In order to do this, the gateway selects the network according to several criteria as the stream bandwidth, the type of service which is broadcast or multicast, the possibility to receive several streams on the same broadcast transport stream. Accordingly, the gateway is not a passive element and one can also manage the case in which a client requests for a broadcast content. At the head-end side, the multicast proxy behavior is globally the same as the one described in EP 1298836 A1. The difference comes from the fact that messages exchanged between the gateway and the multicast proxy are not the usual multicast signaling (IGMP) messages but new ones. IGMP messages are not sufficient to carry indeed all necessary information to allow the gateway to take the best decision. The new messages extend IGMP messages to solve this issue. Accordingly, the invention allows to dynamically adjusting the set of programs or services transmitted by a broadcast link based on requests issued by the target receivers, thus making optimal use of the available broadcast bandwidth.

DETAILED DESCRIPTION OF THE INVENTION

The invention will now be described in greater detail by way of example with reference to the following drawing in which:

FIG. 4 shows method steps performed in an embodiment of the invention in a flow chart;

FIG. 5 shows method steps performed in an embodiment of the invention in a further flow chart.

In the drawing, alike reference numerals refer to alike parts, unless otherwise indicated.

Figure 1:
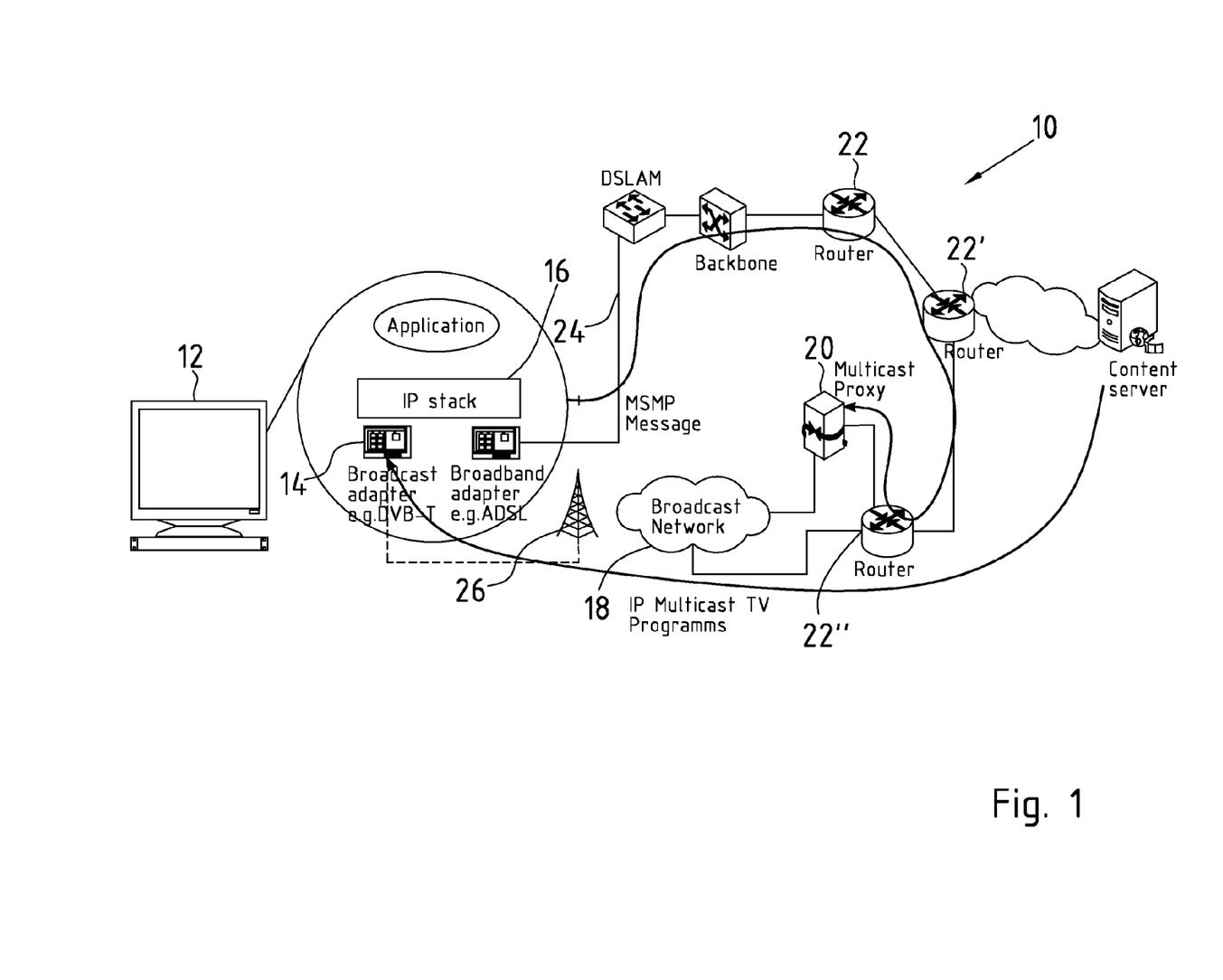
FIG. 1 shows a schematic view of a system for combining multiple communication links.

FIG. 1 depicts a system 10 for combining multiple communication links for supporting the IGMP feature in a broadcast network. A terminal 12 that can be a TV set owns a broadcast interface 14 that is seen by the internal logic as a network interface supporting the IP protocol. This network interface 14 receives video packets and delivers RTP/UDP/IP multicast packets to a IP stack 16. The application opens the multicast socket corresponding to one IP multicast group address assuming the application was able to associate a multicast IP address with a TV program thanks to metadata such as ESG—Electronic Service Guide.

Consequently, the IP stack 16 generates an IGMP request that is then tunneled up to an IGMP frontal called a multicast proxy 20, a function owned by the broadcaster that is hooked to a broadcast network 18. The multicast proxy 20 interacts with the broadcast network infrastructure 18 and possibly activates the forwarding of the TV program if not already activated. The decision to activate a program is done depending of other criteria like the numbers of receivers interested by this program. The part of the broadcast network 18 e.g. a transmitter that is concerned by the program forwarding is linked with the terminal location. This information can be based on GPS information if the terminal 12 is accordingly equipped or by any other means like for instance the identifier of the broadcast transmitter which is broadcast continuously as part of the system information.

Alternatively, when the user tunes to another TV program or when the user shutdowns the service, the application must close the socket. This generates an IGMP message indicating the disconnection from the associated IP multicast group/address. The message is sent again to the multicast proxy 20 that again controls the broadcast network implying a potential stop in forwarding the TV program in the part of the broadcast network 18 associated with the terminal location.

As introduced previously, the multicast proxy 20 permits an interaction between the terminal 12 and the broadcast network 18 through a method compliant with the IPTV state of the art (xDSL TV or DVB IPTV). Typically IGMP messages are received by multicast IP routers 22, 22', 22" that decide to filter and forward multicast IP traffic accordingly. This proxy 20 is identified by an IP address which is known in advance by the home gateway just like the address of the DNS servers or the default gateway. The multicast proxy 20 can be either a separate box or a function embedded in one of the edge or broadcast routers 22, 22', 22".

The multicast proxy 20 must be able to localize the terminal 12 in order to adopt a strategy associated with the IGMP message. The localization can be performed through different means and the information must be attached to the IGMP message. The multicast proxy 20 knows the capacity of the broadcast routers 22, 22', 22" and the bandwidth consumed by each multicast service. It counts the number of candidate receivers for each multicast service and puts the "most wanted" services on the one of the broadcast links. For the services that must be served over a broadcast link 18, it sends control messages to the dedicated broadcast router to make it join those multicast services. It informs the client gateways accordingly. When a service is no longer candidate for broadcast distribution, for example it moved down in the "most wanted" list, the proxy 20 tells the broadcast router 22, 22', 22" to leave the group and informs the gateways that they should request the service over a broadband link 24 using an IGMP report membership message.

The broadcast network 18 can be organized with a unique branch e.g. satellite, a simple tree composed with a set of transmitters distributed among a territory e.g. terrestrial TV or a multi level hierarchical tree e.g. a cellular network supporting multicast or a cable network.

Changing dynamically the content that is multicast over a branch has some implications. First it means that the overall set of programs distributed at a transmission point 26 changes from time to time. This advocates for a broadcast network 18 where the transport multiplex is formed at the extremities, i.e. the transmission points 26.

Removing a program frees some bandwidth that can be used for various needs like downloading metadata (software updates, applications), allowing more bandwidth for statistical multiplexing programs and thus better quality, allowing more bandwidth for push VOD.

A broadcast network (DVB-C, DVB-T, DVB-S . . . ) is made up of several Transport Streams (TS), each one being delivered at a different frequency. A transport stream encapsulates packetized elementary streams. Each piece of data (e.g. tables) or elementary stream in a transport stream is identified by a 13-bit packet ID (PID). According to the invention, it is to be assumed that at least one of the transport streams delivers IP multicast traffic. IP multicast traffic may coexist with usual broadcast traffic within the same transport stream.

The broadcast adapter 14 can tune to only one frequency, i.e. it can receive only a single transport stream TS at the same time. It is considered that the broadcast adapter 14 is efficient enough to transmit the content carried over all the PIDs, i.e. it can demultiplex all the PIDs, within the selected transport stream.

For multicast traffic, a different PID can be assigned to each IP service. Consequently, each service is managed individually, the traffic contained in packets of a given value (PID) corresponding to a single multicast service. The gateway is not flooded with useless traffic but the broadcast adapter 14 has to filter as many PID as multicast services received simultaneously. The other solution consists in broadcasting all IP multicast traffic within the same PID. The broadcast adapter 14 needs to listen to only one PID but the gateway is flooded with useless traffic. The way to identify IP multicast packets, i.e. a single PID or a PID per IP stream, has no impact on the invention described herein as both concepts are conceivable.

Figure 2:
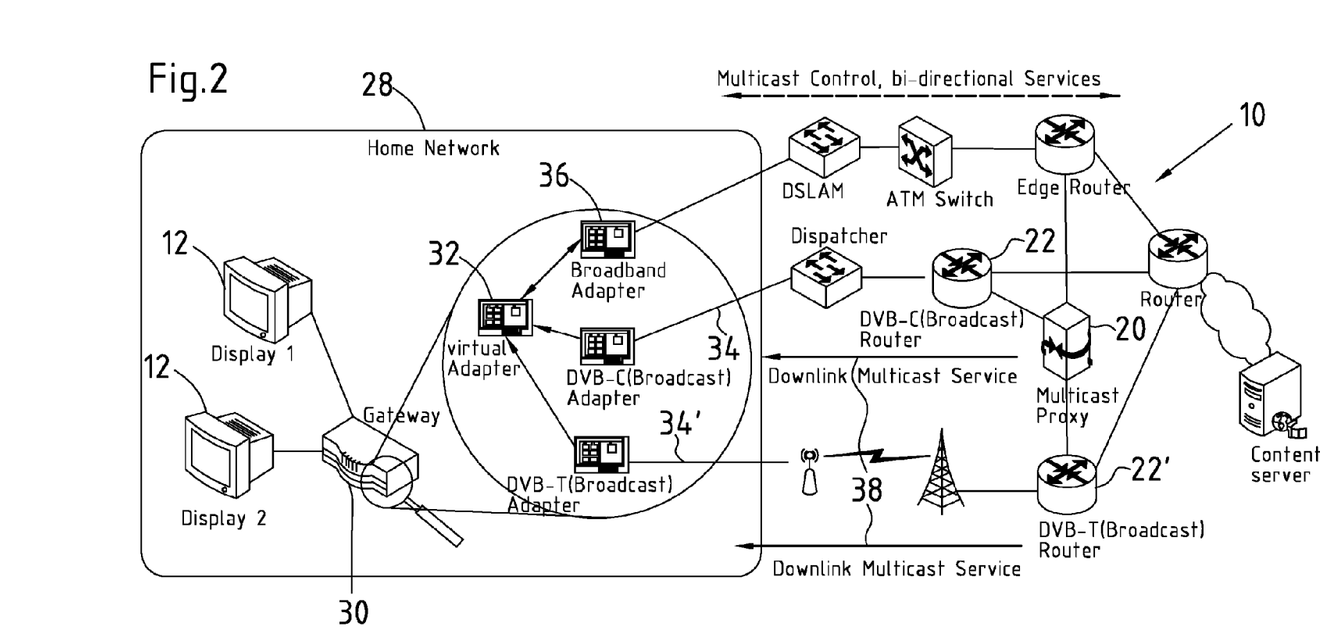
FIG. 2 shows a further schematic view of a system for combining multiple communication links according to an embodiment of the invention.

In order to offload a broadband access from heavy multimedia multicast traffic, said traffic may be redirected to a broadcast transmission link 26 such as DVB-T whenever possible and judicious. In the previous, the optimization of the bandwidth in the broadband and broadcast networks through an aggregation point was described. This solution is sufficient and well adapted if there is only one multicast service received at a given moment by the gateway. But if there is a gateway 30 with several connected terminals 12 such as a home network 28, each one is requesting for a different multicast service at the same time, as shown in FIG. 2.

As it is not clear what will be the delivery behavior if all services are available on broadcast, as the first requested multicast stream may be delivered over broadcast and the others, by default, on the broadband, even if one would need more bandwidth.

Moreover, the case where the gateway 30 has several broadcast adapters is not dealt with. The gateway may privilege one broadcast link to another.

In the following, a system and method that optimizes the delivery of multicast traffic over a broadband and one or several broadcast networks if the gateway 30 fulfils at least one of the two above mentioned cases i.e. several broadcast adapters or/and several multicast streams requested simultaneously is presented. An overview of the system is shown in FIG. 2.

In FIG. 2, the home network 28 is made up with the gateway 30 and the terminals 12. The gateway 30 gathers a broadband adapter 36 and one or more broadcast ones 34, 34'. It contains also an adapter selector 32, called virtual (or logical) adapter 32, which hides the broadband 36 and broadcast(s) adapters 34, 34'. All the terminals 12 see is this virtual adapter 32. The virtual adapter 32 hides the plurality of interfaces 34, 34', 36 to the IP layer, one of them being bidirectional, the other ones being broadcast receive-only. That is, every IP packet sent out by the gateway 30 goes through the bidirectional link and all the traffic received on both interfaces is received by the virtual adapter 32 and presented to the IP layer.

Each time a terminal 12 requests for a multicast stream, the virtual adapter 32 has the responsibility to select smartly the best adapter. According to the requests emitted by the terminals 12 to join or leave a multicast group, the virtual adapter 32 can ask to change dynamically and seamlessly the physical adapter associated to a multicast stream. The virtual adapter 32 filters IGMP messages and processes the improved multicast proxying protocol.

The gateway 30 does not transmit a generic request (IGMP message) to the multicast proxy 20 but analyzes the request according to several criteria before sending the formatted message.

Criteria are based on home network 28 parameters which are IP multicast streams requested simultaneously, available broadcast adapters, multicast/broadcast stream bandwidth and broadcast multiplex organization.

Usually when a terminal 12 wishes to receive a particular multicast traffic, it issues an IGMP Membership Report message via its network adapter towards the edge router which then builds the required distribution tree (towards the multicast source) and sends the multicast traffic towards the terminal 12. Instead, in the invention, the client IGMP message is captured and analyzed by the adapter selector 32 which sends, if needed, a control message via the broadband adapter 36 towards the multicast proxy 20, requesting that the same multicast stream be served over a broadcast link 38. According to a particular embodiment, the multicast proxy 20 sends a message to the corresponding broadcast router 22, 22' to build the required distribution tree (towards the multicast source) and send the multicast traffic to the terminal 12.

From the terminal's perspective, the additional control messages are invisible. It requests a multicast flow using normal IGMP messages and receives the multicast traffic via the virtual adapter 32.

IGMP messages as defined in RFC 1112 (v1), RFC 2236 (v2) or RFC 3376 (v3) are not sufficient to carry all needed information. Consequently, new control messages are introduced which are presented in the following.

IGMP messages are used to optimize the delivery of multicast traffic over the network. But IGMP messages are not sufficient to transmit all necessary data and need to be enriched with additional information. Hereafter is a description of this new protocol and the way messages are exchanged.

The virtual adapter 32 captures all the outgoing IGMP messages and replaces them by a custom protocol to request that the same multicast traffic be delivered over the broadcast link 38.

All the communication between the virtual adapter 32 and the multicast proxy 20 is done by UDP messages sent to a predefined port (for example 5000). The virtual adapter's IP address is the gateway's public IP address. The Multicast Proxy's IP address is known in advance or received via DHCP.

The multicast proxy 20 knows what services are currently being served over the various broadcast links 38 and consequently the remaining capacity of each link. Thus, it can either acknowledge or refuse a join request depending on whether the service is already being delivered or otherwise the remaining bandwidth on the broadcast links 38. When it acknowledges the request, the virtual adapter 32 must prepare to receive the multicast traffic over the associated broadcast adapter 34, 34'.

When it refuses, then the virtual adapter 32 must join the multicast group with its broadband interface 36 using a normal IGMP membership report message (no matter which version of the IGMP protocol). When a terminal 12 is the first one to request a given multicast service and the request is acknowledged by the proxy 20, the proxy 20 sends a message to the dedicated broadcast router 22, 22' to start delivering the service over the broadcast link 38. When the terminal 12 receiving a given service leaves the service, the proxy 20 informs the broadcast router 22, 22' that it can stop delivering the service.

Figure 3:
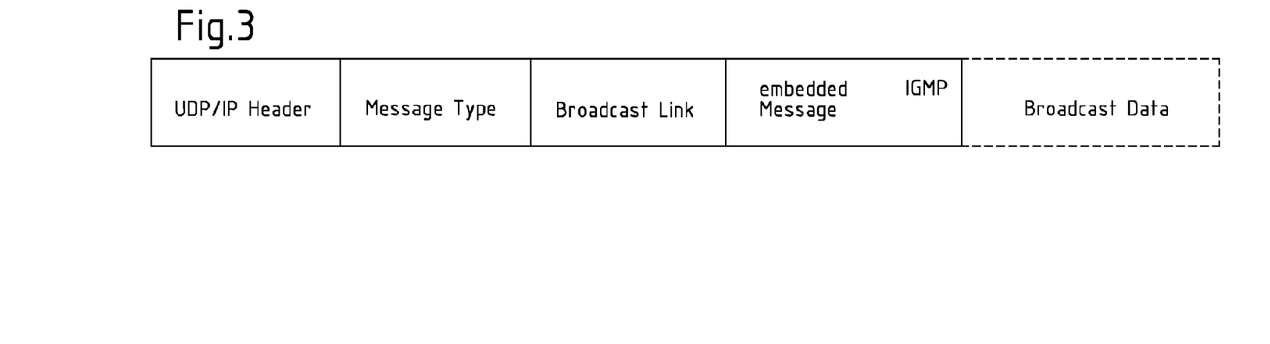
FIG. 3 shows a detail of a packet according to an embodiment of the invention.

The protocol messages have the following syntax as depicted in FIG. 3:
  UDP/IP header (source/destination address and ports)
  Message type, 8 bits, described below
  Broadcast link field, 8 bits, described below
  Embedded IGMP message, depending on the message type
  Broadcast data, optional, depending on the message type "Broadcast link" field is a bit mask where each bit corresponds to a type of broadcast transmission link. Its usage depends on the message type and it is given in the above message type description.

For instance, one can have the following correspondence table:

| Values | Broadcast link type |
|---|---|
| 0x1 | DVB-T |
| 0x2 | DVB-S |
| 0x4 | DVB-C |
| 0x8 | DVB-H |

The following describes the message types and their use.

Client join request (membership report)

Message type: 0x01

Broadcast link lists all the gateway's available broadcast adapters selected by the virtual adapter 32 to receive the wanted multicast traffic.

Embedded IGMP message is the message sent by the client application and contains the multicast group the terminal 12 wishes to join.

Broadcast data: not applicable.

Client leave request

Message type: 0x02

Broadcast link: specify the broadcast link receiving the multicast stream.

Embedded IGMP message is the message sent by the client application and contains the multicast group the terminal 12 wishes to leave.

Broadcast data: not applicable.

Join acknowledged by proxy to client

Message type: 0x10

Broadcast link: specify the broadcast link on which the multicast traffic is available.

One and only one bit must be set to 1, the others being zeroed.

Embedded IGMP message is the message carried by the join request and contains the multicast group the terminal 12 wishes to join. Receiving this message, the virtual adapter 32 must prepare to receive the multicast traffic over the dedicated broadcast adapter.

Broadcast data contains the bandwidth required to receive the multicast stream and all parameters about the broadcast link to allow connecting quickly to the multicast stream. The set of parameters depends on the type of broadcast link (frequency, modulation, FEC parameters, polarization, PID . . . ).

Join denied by proxy (=go for normal multicast)

Message type: 0x11

Broadcast link: not applicable.

Embedded IGMP message is the message carried by the join request and contains the multicast group the terminal 12 wishes to join. Receiving this message, the virtual adapter 32 must issue a normal IGMP membership report to receive the multicast traffic normally over the broadband adapter.

Broadcast data: not applicable.

Proxy requests join from BC router

Message type: 0x12

Broadcast link: not applicable.

Embedded IGMP message is a membership report message and contains the multicast group that the broadcast router must join.

Broadcast data: not applicable.

Proxy requests leave from BC router

Message type: 0x13

Broadcast link: not applicable.

Embedded IGMP message is a leave group message and contains the multicast group that the broadcast router must leave.

Broadcast data: not applicable.

Proxy requests clients to report membership (membership query)

Message type: 0x14

Broadcast link: not applicable.

Embedded IGMP message is a membership query message and contains the multicast group for which the proxy wishes to count the members.

Broadcast data: not applicable.

Figure 41:
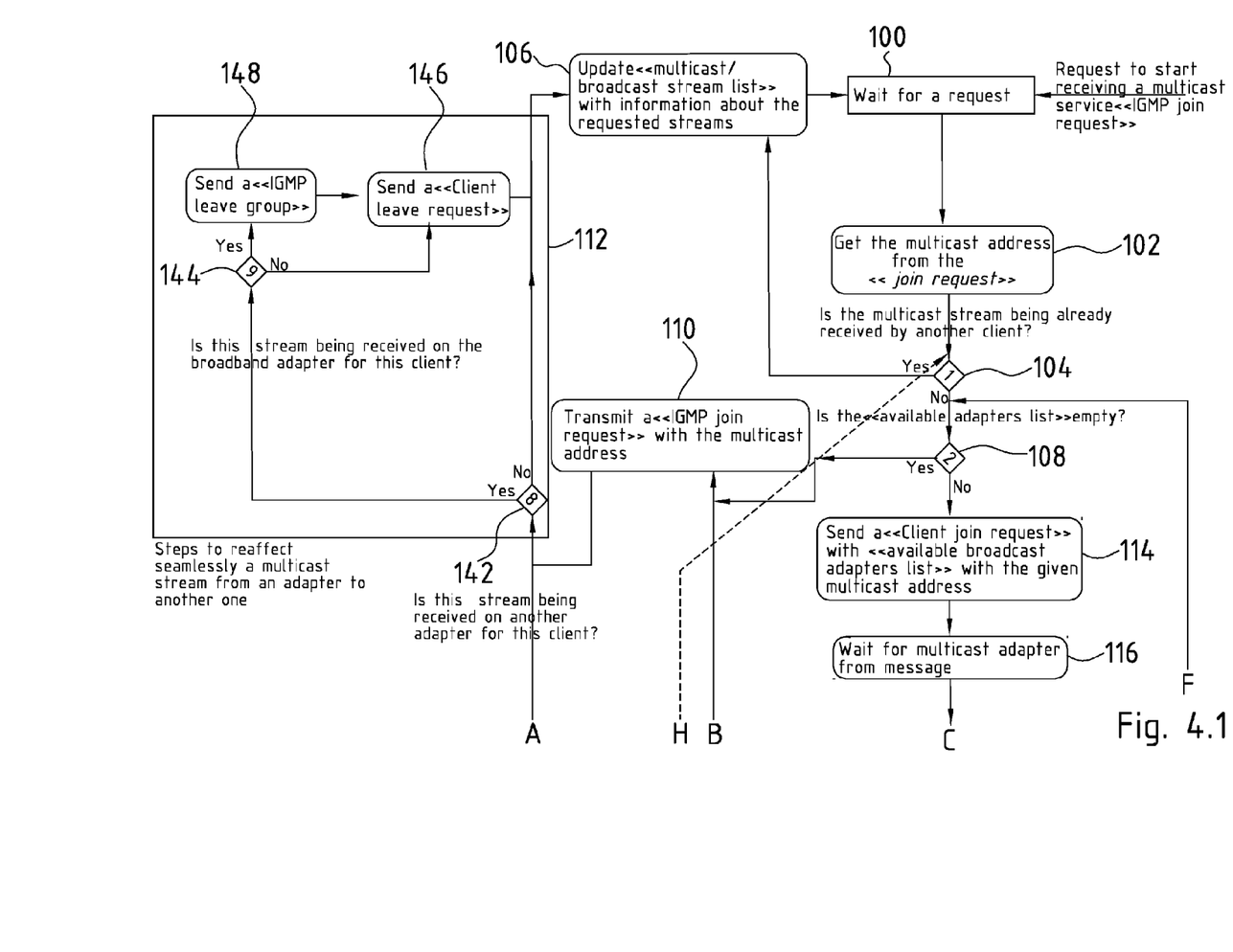
Figure 42:
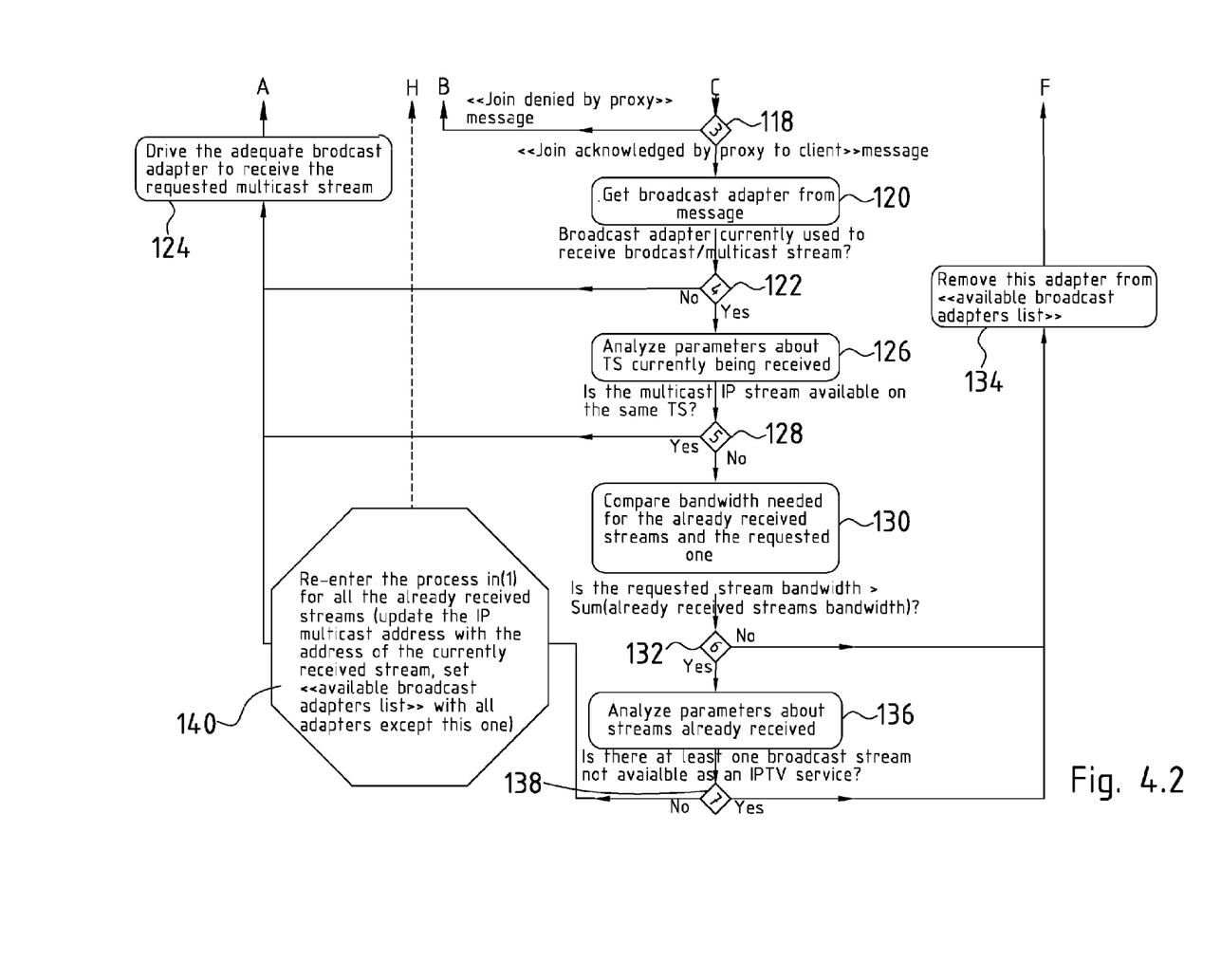

In the following, the behavior of the virtual adapter 32 to select the appropriate adapter when it is requested to receive a multicast IP stream is described. The behavior is depicted in the flow chart of FIG. 4, which is split in FIGS. 4.1 and 4.2. The virtual adapter 32 receives only IGMP messages from the terminal 12. IGMP request messages do not contain any information about the requested multicast stream itself like bandwidth, type of content and so on.

First of all, the virtual adapter 32 maintains a table with the list of information about the broadcast streams being received: broadcast adapter, multiplex description like frequency, required bandwidth and information about the multicast streams being received: multicast IP address, number of clients listening to each stream, required bandwidth, adapter and information about the adapter 34, 34' in case of broadcast one (multiplex description). This list is called "multicast/broadcast stream list".

The virtual adapter 32 manages also a list of available broadcast adapters. This list is initialized with all existing broadcast adapters 34, 34', even if they are already used to receive streams. If this list is empty, that means there is no broadcast adapter 34 available. Hence, the virtual adapter 32 makes no sense because all IP multicast streams will be automatically delivered over the broadband network through broadband adapter 36.

The initial state of the virtual adapter 32 is to wait for requests at 100. Here, the virtual adapter 32 is waiting for an IGMP request from a terminal 12. The "available broadcast adapters" list is initialized with all broadcast adapters 34, 34'.

When a terminal 12 requests for a multicast stream, the virtual adapter 32 analyses the IGMP message and gets the multicast IP address as well as the terminal IP address at 102.

Several cases emerge from thereon at decision unit 104.

In the first case, the multicast stream is currently being received by another terminal 12 in the home network 28. The virtual adapter 32 only has to increment the counter of terminals 12 listening to this stream via the update of multicast/broadcast stream list function at 106. It has nothing else to do because the multicast stream is already being delivered to the home network. More particularly, the virtual adapter 32 only has to deliver the stream on the adequate link in the home network. It does not have to modify any other configuration parameter nor transmit a request to the proxy.

Consequently, it moves back to state 100 to wait for further requests.

In the second case, no other terminal 12 of the home network 28 is receiving this stream.

The virtual adapter 32 checks at 108 if the available broadcast adapters 34 list is empty.

If the list is empty, the virtual adapter 32 transmits an IGMP join request with the adequate multicast IP address at 110 on the broadband network, enters the "seamless re-affectation" steps at 112 (these steps are described later), updates the multicast/broadcast stream list at 106 and returns in the initial state 100.

If the list is not empty, then the virtual adapter 32 transmits a "Client join request" (message type: 0x01) at 114 to the multicast proxy 20, with the available broadcast adapters 34 list as parameter.

When receiving the answer message from the multicast proxy 20 at 116, it analyzes it. Two cases happen at 118: if the message is a "join denied by proxy", the virtual adapter 32 transmits an IGMP join request with the adequate multicast IP address on the broadband network, enters the "seamless re-affectation" steps 112 (these steps are described later), and updates the multicast/broadcast stream list at 106 and returns in the initial state 100.

If the message is a "join acknowledged by proxy to client" message, the virtual adapter 32 analyzes it and gets the broadcast adapter at 120. Whether this last adapter is already in use to receive any broadcast or multicast stream is decided at 122. If the broadcast adapter 34 is not used, then the virtual adapter 32 drives the broadcast adapter 34 to receive the requested multicast stream by passing all needed parameters (frequency, modulation, PID, . . . ) at 124, enters the "seamless re-affectation" steps 112 (these steps are described later), updates the multicast/broadcast stream list at 106 and returns in the initial state 100.

If the broadcast adapter 34 is currently used to receive one or several streams, the virtual adapter 32 analyzes the parameters of these last streams (transport stream parameters) at 126. It checks if the multicast stream is available on the same transport stream (TS) than the stream(s) being received at 128.

If the requested stream is also available on the same transport stream, then the virtual adapter 32 drives the broadcast adapter 34 to retrieve also the requested multicast stream by passing all needed parameters (notably the PID) at 124, enters the "seamless re-affectation" steps 112, updates the multicast/broadcast stream list at 106 and returns in the initial state 100.

If not, the broadcast adapter 34 can't receive them simultaneously. Then, the virtual adapter 32 has to select the most appropriate one to be retrieved on the broadcast network. The selection criterion is the bandwidth at 130. If the sum of the already received streams requires more bandwidth than the requested one at 132, the virtual adapter 32 updates available broadcast adapters list by removing this broadcast adapter at 134 and returns to step 108. The virtual adapter 32 will still continue to receive the already received streams over the selected broadcast link as before.

If the requested stream requires more bandwidth than the already received ones, then the virtual adapter checks if among all the currently received streams at 136, there is at least one broadcast stream that is not available as a multicast service (e.g. IPTV service) at 138. If it is the case, this broadcast adapter 34 will still continue to receive the currently received streams. The virtual adapter 32 updates available broadcast adapters list at 134 by removing this broadcast adapter and returns to step 108.

If not, all streams are available as multicast services. This step is repeated for all streams individually. The virtual adapter 32 re-enters in the process, i.e. goes to step 104 for the already being received stream so as to receive it on another adapter 34'. The available broadcast adapters list is initialized with all existing broadcast adapters 34, 34' except this one and the multicast address that becomes the one of the already received IP multicast stream. This step 140 is done recursively. Then, the virtual adapter 32 affects the initial requested stream to the broadcast adapter 34, i.e. it drives the broadcast adapter 34 to retrieve the requested multicast stream by passing all needed parameters (TS parameters, PID . . . ) at 124, enters the "seamless re-affectation" steps 112, updates the multicast/broadcast stream list at 106 and returns in the initial state 100.

By proceeding as indicated above, it is guaranteed that the switch between the broadcast network and the broadband one is seamless for the terminal 12, i.e. there is no content reception breakdown. For this, the virtual adapter 32 ensures that the already received stream is received on another adapter, which can be broadcast or broadband, before stopping its reception on the broadcast adapter affected to the new stream.

If the two streams bitrates are identical, it may be possible to take into account an additional differentiator, i.e. the terminal priority, e.g. the display in the lounge having priority on the child's bedroom one. This point is not taken into consideration in the flow chart.

Above, the "seamless re-affectation" steps 112 were mentioned which will be presented in the following. First, the virtual adapter 32 checks if the requested stream is already received on another adapter for the same client at 142. This happens when a stream is re-affected from an adapter 34 to another. The algorithm ensures the stream will be received on the new adapter 34 before being stopped on the old one. If the requested stream is not received on another adapter 34, then the virtual adapter 32 updates the multicast/broadcast stream list at 106 and returns in the initial state 100.

If the requested stream is already received on another adapter 34, then the virtual adapter 32 checks if this stream is also being received on the broadband adapter 36 for this client at 144. If the stream is also received on another broadcast adapter and not on the broadband adapter for this client, then the virtual adapter 32 sends a "client leave request" (message 0x02) to the multicast proxy 20 at 146. Then, the virtual adapter 32 updates the multicast/broadcast stream list at 106 and returns in the initial state 100. If this stream is also being received on another broadband adapter 34, then the virtual adapter 32 sends an "IGMP leave group" at 148. Then the process goes to step 146 of sending a "client leave request".

Figure 51:
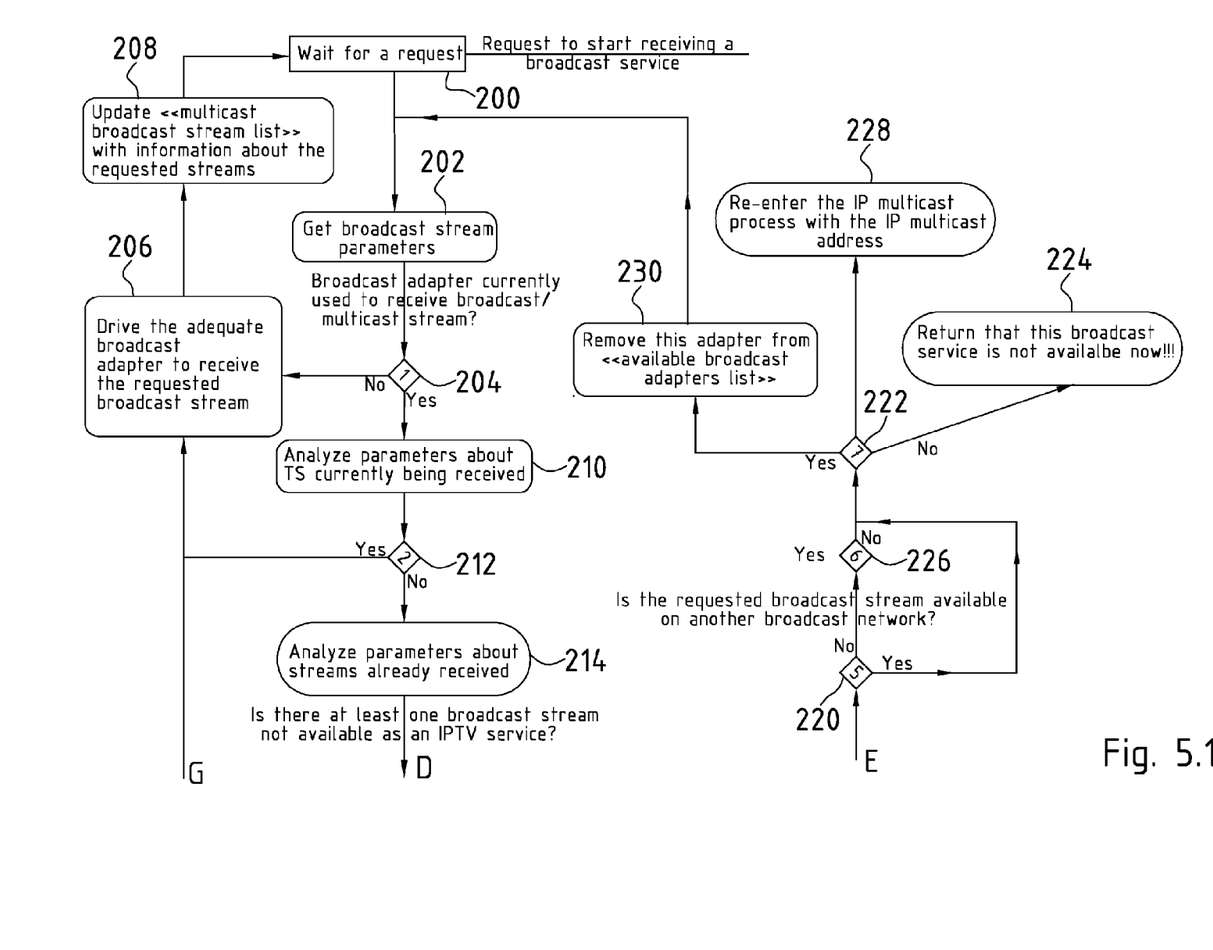
Figure 52:
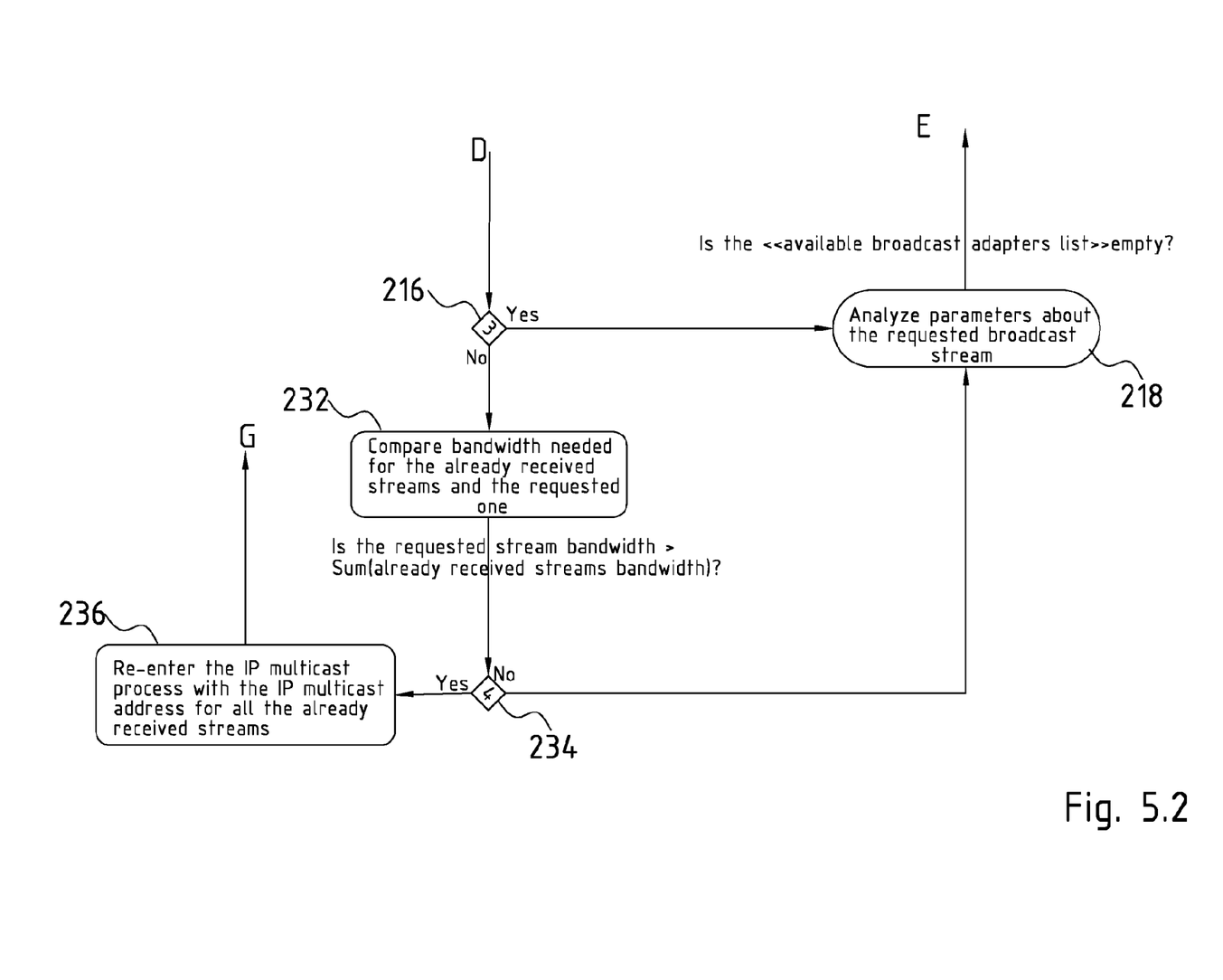

With reference to FIG. 5, which is split in FIGS. 5.1 and 5.2, the behavior of a virtual adapter 32 when it is requested to receive a broadcast stream is described. The initial state of the virtual adapter 32 is the same as in the previous section, i.e. it is waiting for a request at 200. In this case, it is waiting for a request to receive a broadcast stream from a terminal 12. It also initializes the available broadcast adapters list with all existing broadcast adapters.

When the virtual adapter 32 receives such a request, it gets information about the broadcast stream (TS, PID . . . ) at 202 and checks if the broadcast adapter 34 is available, i.e. it is not used to receive another stream, or not at 204. If the broadcast adapter 34 is not used, then the virtual adapter 32 drives the broadcast adapter 34 to retrieve the requested broadcast stream by passing all needed parameters (TS parameters, PID . . . ) at 206, updates the multicast/broadcast stream list and returns in the initial state 208.

If the broadcast adapter 34 is currently used to receive other stream(s), the virtual adapter 32 analyzes the parameters of this last stream, called transport stream parameters, at 210. It checks at 212 if the broadcast stream is available on the same transport stream (TS) than the stream(s) being received.

If all streams are on the same transport stream, then the virtual adapter drives the broadcast adapter to retrieve also the requested broadcast stream by passing all needed parameters (notably the PIDs) at 206, updates the multicast/broadcast stream list at 208 and returns in the initial state 200.

If they are not on the same transport stream, i.e. the broadcast adapter can't receive them simultaneously, then the virtual adapter 32 has to select the most appropriate stream(s) to be received on this broadcast network at 214. It checks at 216 if among the currently received streams there is one broadcast stream that is not available as an IP stream (IPTV service). If there is at least one broadcast stream not available as an IP stream then the virtual adapter 32 privileges to continue to receive the currently received stream at 216 and checks if the requested broadcast stream is available as an IP stream (IPTV service) or not at 218. As one does not want the broadcast stream to be stopped, the broadcast adapter will continue to receive the broadcast stream.

Then, the virtual adapter 32 updates the available broadcast adapters 34 list by removing this broadcast adapter 34 and checks if the <<available broadcast adapters list>> is empty or not 220. If the list is empty, then the virtual adapter 32 checks at 222 if the requested broadcast stream is available as an IP stream (IPTV service) or not. If not, the virtual adapter 32 returns an error message 224 indicating that the requested stream is not available. If it is available as an IP stream, then it enters a process with the adequate IP address 228 and the list of available broadcast adapters 34 contains all the broadcast adapters except this one. If the list is not empty, then the virtual adapter 32 checks if the requested broadcast stream is available on another broadcast network or not at 226. If it is available on another broadcast network, step 202 is entered through 230 so that the list of available broadcast adapters 34 contains all the broadcast adapters 34 except this one.

If all the currently received streams are available as IP streams at 216, then the virtual adapter 32 checks at 232 if the requested broadcast stream bandwidth is greater than the sum of the bandwidths of the currently received ones. If it is the case at 234, then the virtual adapter 32 enters the process at 236 with the adequate IP address and the list of the available broadcast adapters contains all the broadcast adapters for each already received stream. After, it drives the broadcast adapter to receive the requested broadcast stream by passing all needed parameters (frequency, modulation, PID, . . . ) at 206, updates the multicast/broadcast stream list 208 and returns in the initial state 200.

If it is not the case, the virtual adapter 32 checks if the requested broadcast stream is available as an IP stream (IPTV service) or not at step 218.

Several steps which are described above are now outlined in more detail.

Step: Request from a Terminal 12 to Stop Receiving a Multicast IP Stream

When a terminal 12 wants to stop receiving a multicast IP stream, the virtual adapter 32 lowers the counter. If the counter is not null, then the virtual adapter 32 does nothing, to let the other terminal(s) continue to receive this multicast stream. If the counter is null, then the virtual adapter 32 sends a message to the "multicast proxy" to leave the group (message 0x02), sends an "IGMP leave group" message, updates the multicast/broadcast stream list by removing information about this Multicast IP stream, and process the algorithm as described above, for all the Multicast IP streams that are currently received on broadband to optimize the delivery of streams to the home network 28. To do this, the virtual adapter 32 will select a stream and update the available broadcast adapters 34 list with all existing broadcast adapters 34, the given multicast address that becomes the one of the already received Multicast IP streams, and the multicast/broadcast stream list by removing information about the already received Multicast IP stream.

Step: Request from a Terminal to Stop Receiving a Broadcast Stream

When a terminal 12 wants to stop receiving a broadcast stream, the virtual adapter 32 updates the multicast/broadcast stream list by removing information about this broadcast stream, processes the algorithm as described above for all the Multicast IP streams that are currently received on broadband to optimize the delivery of streams to the home network 28. To do this, the virtual adapter 32 will select a stream and update the available broadcast adapters 34 list with all existing broadcast adapters 34, the given multicast address that becomes the one of the already received Multicast IP streams, and the multicast/broadcast stream list by removing information about the already received Multicast IP stream.

Step: Request Received from the Multicast Proxy Indicating that a Multicast IP Stream is No Longer Available on the Broadcast Network In the multicast proxy 20, the algorithm of selection of broadcast IP multicast streams can lead to change the delivery network of a multicast IP stream and switch this last from broadcast to broadband. In this case, the proxy 20 must inform the virtual adapter 32 with the modifications (message 0x11). When such a message is received by the virtual adapter 32, it starts listening the multicast IP stream on the broadband adapter (sends an "IGMP client join" message) and then stops listening this stream on the broadcast adapter 34. If the broadcast adapter 34 is unused, the process described above is performed for all the other Multicast IP streams that are currently received to optimize the delivery of streams to the home network 28.

Step: Request Received from the Multicast Proxy Indicating that a Multicast IP is Now Available on the Broadcast Network In the multicast proxy 20, the algorithm of selection of broadcast IP multicast streams can lead to change the delivery network of a multicast IP stream and switch this last from broadband to broadcast. In this case, the proxy 20 must inform the virtual adapter with the modifications, using a message 0x10. When such a message is received by the virtual adapter, it enters the process described above.

In addition to the state of the art, the multicast proxy must manage the messages described above and must be able to interpret the messages received from the virtual adapters (0x01 and 0x02), answer to the virtual adapters (0x10, 0x11 and 0x14) and transmit request to the broadcast router(s) (0x12 and 0x13).

The broadcast router 22 is a typical router equipment that has been enhanced to become controllable by the protocol. When it receives the join message (type 0x12) from the proxy 20, it reads the attached IGMP message to retrieve the multicast group. It uses the normal procedure (PIM, DVMRP, . . . ) to request the same multicast service from its neighbor routers 22'. It then performs the broadcast link configuration to carry the additional service.

Upon reception of the leave message (type 0x13) from the proxy 20, it leaves the group indicated by the multicast address carried by the embedded IGMP message and stops sending the service over the broadcast link 38. The way the broadcast router drives the equipment that manages the list of broadcast services (e.g. the IPE for DVB-H) and its signaling (e.g. SI/PSI tables) is out of scope of this disclosure.

In the previous description, the adapter selection is achieved in the gateway 30. A variant consists in centralizing the selection in the multicast proxy 20. Said proxy 20 must manage a table with the configuration of each gateway (broadcast adapters . . . ) and all streams received by each gateway so as to select the best link candidate. But the multicast proxy 20 does not know if broadcast streams are currently being received by the gateway. This could lead to select a broadcast adapter that is not the good candidate because it is receiving a broadcast stream. To fill this lack, the virtual adapter 32 must also inform the multicast proxy 20 with information about the currently received broadcast streams.

Mapping indicates which terminal belongs to which DVB-T router. Multicast proxy 20 knows localization of DSLAMs 300 and coverage area of broadcast routers and maps the terminal requests to the appropriate broadcast router. Control message flows are shown with a dashed line 302, multicast traffic is represented by a solid line 304 to a content server 306 in FIG. 6.

Figure 6:
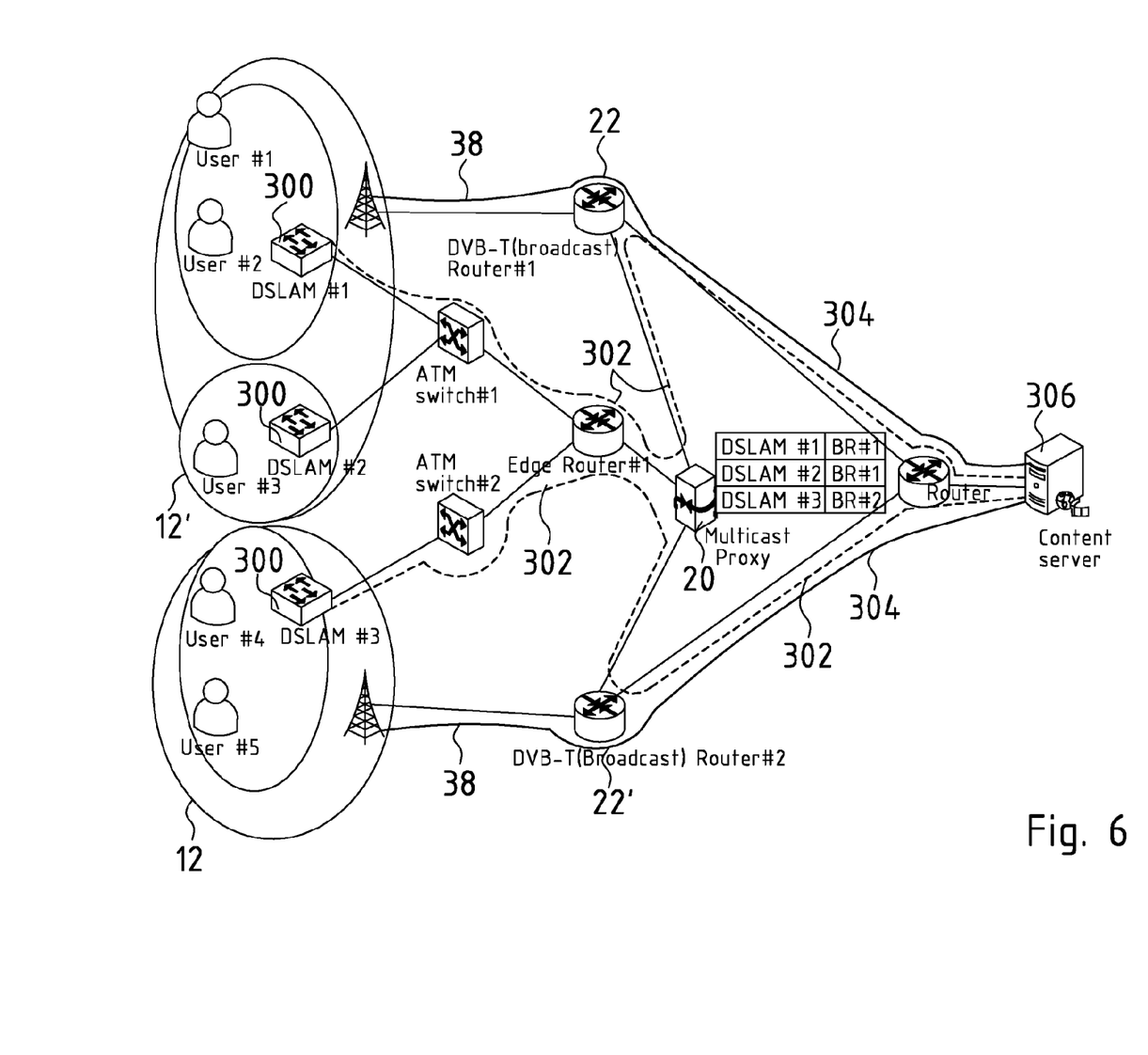
FIG. 6 shows a further schematic view of a system for combining multiple communication links according to an embodiment of the invention.

Alternatively, there could be one proxy per DVB-T/broadcast coverage area. This would imply configuring the virtual adapters in that area to always contact the right proxy. The proxy could be integrated in the DVB-T/broadcast router and would not have to perform any mapping operation.

The handoff to the broadcast link can also be network initiated: at some point in time, the proxy has refused a number of join requests for a specific group because of insufficient bandwidth on the broadcast link. When another service is terminated, the broadcast bandwidth frees up, giving the opportunity to carry another service. The proxy 20 sends an IGMP membership query for the previously refused group to reach the virtual adapters currently receiving this service. The virtual adapters 32 that are currently receiving the service respond with a "Client join request" (message type 0x01) towards the proxy 20 in addition to the normal IGMP membership report message. The proxy 20 can then decide to switch the service to the broadcast link depending on the number of interested clients.

In summary, the invention allows to dynamically adjusting the set of programs or services transmitted by a broadcast link based on requests issued by the target receivers, thus making optimal use of the available broadcast bandwidth.

Although certain embodiments only of the invention have been described herein, it will be understood by any person skilled in the art that other modifications, variations, and possibilities of the invention are possible. Such modifications, variations and possibilities are therefore to be considered as falling within the spirit and scope of the invention and hence forming part of the invention as herein described and/or exemplified.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A client device for receiving a multicast stream through multiple communication networks, comprising a broadband network and at least one broadcast network, said client device comprising:
   a broadband interface for connecting to the broadband network;
   at least one receive-only broadcast interface for connecting to the at least one broadcast network; and
   a processor configured to:
      send a control message of a protocol to a multicast proxy, said control message being sent upon a client request for said multicast stream, said control message requesting said multicast stream to be transmitted over the at least one broadcast network;
      select one of the at least one receive-only broadcast interface associated with a broadcast network for receiving said multicast stream and configure said selected broadcast interface with at least a frequency upon a reception of an acknowledgment to said control message, said acknowledgment comprising an indication of the broadcast network on which said multicast stream is available, said acknowledgment further comprising at least the frequency; and
      select the broadband interface for receiving said multicast stream and send another control message requesting said multicast stream to be transmitted over the broadband network upon a reception of a denial to said control message.

2. The client device according to claim 1, wherein the processor is further configured to capture and analyze the client request for the multicast stream, and send the control message towards a multicast proxy server, only in case the multicast stream is not currently being received.

3. The client device according to claim 1, wherein the protocol is an extension of an IP Group Management Protocol.

4. A method for receiving a multicast stream through multiple communication networks, comprising a broadband network and at least one broadcast network being connected respectively to a broadband interface and at least one receive-only broadcast interface of a client device, wherein said method comprises:
   sending a control message of a protocol to a multicast proxy, said control message being sent upon a client request for said multicast stream, said control message requesting said multicast stream to be transmitted over the at least one broadcast network;
   selecting one of the at least one receive-only broadcast interface associated with a broadcast network for receiving said multicast stream and configuring said selected broadcast interface with at least a frequency upon a reception of an acknowledgment to said control message, said acknowledgment comprising an indication of the broadcast network on which said multicast stream is available, said acknowledgment further comprising at least the frequency; and
   selecting the broadband network interface for receiving said multicast stream and sending another control message requesting said multicast stream to be transmitted over the broadband network upon a reception of a denial to said control message.

5. The method according to claim 4, further comprising redirecting the client request to a broadcast router such that a IP multicast stream is selected to be transmitted over the broadcast network to the selected broadcast interface of the client device.

6. The method according to claim 4, further comprising capturing and analyzing the client request for said multicast stream and sending the control message towards the multicast proxy, only in case the multicast stream is not currently being received.

7. The method according to claim 6, comprising redirecting the client request to a corresponding broadcast router which builds a required distribution tree so as to send the multicast stream to the client device over the broadcast network.

8. The method according to claim 4, wherein the protocol is an extension of an IP Group Management Protocol.

9. The method according to claim 4, wherein the protocol includes a message to signal a request from the client device to receive or to stop receiving a multicast IP stream.

10. The method according to claim 4, wherein the protocol includes a message to signal a request received from the multicast proxy server indicating that a multicast IP stream is no longer available or is now available on the broadcast network.

11. The method according to claim 4, wherein the interface is selected according to the multicast stream bandwidth or the popularity of said multicast stream.

* * * * *